United States Patent
Haile et al.

(10) Patent No.: US 7,247,402 B2
(45) Date of Patent: Jul. 24, 2007

(54) POWER GENERATOR AND METHOD FOR FORMING THE SAME

(75) Inventors: Sossina Haile, Altadena, CA (US); Paul Ronney, Monrovia, CA (US); Zongping Shao, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 503 days.

(21) Appl. No.: 10/875,791

(22) Filed: Jun. 23, 2004

(65) Prior Publication Data

US 2007/0111064 A1 May 17, 2007

Related U.S. Application Data

(60) Provisional application No. 60/482,061, filed on Jun. 23, 2003.

(51) Int. Cl.
*H01M 8/12* (2006.01)
*H01M 8/14* (2006.01)
*H01M 4/00* (2006.01)
*H01M 8/00* (2006.01)
*H01M 8/10* (2006.01)

(52) U.S. Cl. ............... 429/26; 429/20; 429/32; 429/33; 429/40; 429/46

(58) Field of Classification Search .......... 429/13, 429/20, 26, 32, 33, 40, 46
See application file for complete search history.

(56) References Cited

U.S. PATENT DOCUMENTS

2007/0003806 A1* 1/2007 Sarkar et al. ............... 429/26

FOREIGN PATENT DOCUMENTS

WO WO 2005/057701 * 6/2005

OTHER PUBLICATIONS

Ahn, J., Eastwood, C., Sitzki, L., Ronney, P. D., "Gas-phase and catalytic combustion in heat-recirculating burners," to appear in Proceedings of the Combustion Institute, vol. 30 (2004).
Ronney, P. D., "Analysis of non-adiabatic heat-recirculating combustors," Combustion and Flame, vol. 135, pp. 421-439 (2003).
Maruta, K., Takeda, K., Ahn, J., Borer, K., Sitzki, L, Ronney, P. D., Deutschman, O., "Extinction Limits of Catalytic Combustion in Microchannels," Proceedings of the Combustion Institute, vol. 29, pp. 957-963 (2002).

(Continued)

*Primary Examiner*—Patrick Joseph Ryan
*Assistant Examiner*—Thomas H. Parsons
(74) *Attorney, Agent, or Firm*—Tope-McKay & Associates

(57) ABSTRACT

The present invention relates to a power generator and method for forming the same. More specifically, the present invention comprises a chamber containing a solid oxide fuel cell (SOFC), with a spiral-wound counter-current heat exchanger encompassing the chamber. The spiral-wound counter-current heat exchanger includes a first inlet and an outlet, where both the first inlet and the outlet are connected with the chamber such that reactants introduced into the power generator flow into the first inlet and past the SOFC, where the reactants react to produce energy and reaction products. The reaction products thereafter transfer heat to the reactants and subsequently exit through the outlet. A reactor can be positioned downstream of the SOFC for converting reactants not reacted by the SOFC.

79 Claims, 14 Drawing Sheets

OTHER PUBLICATIONS

Cohen, A., Ronney, P. D., Frodis, U., Sitzki, L, Meiburg, E., Wussow, S., "Microcombustor and combustion-based thermoelectric microgenerator," U. S. Patent No. 6,613,972, Sep. 2, 2003.

S. A. Lloyd, F. J. Weinberg, "A burner for mixtures of very low heat content," Nature 251 (1974) 47-49.

S. A. Lloyd, F. J. Weinberg, "Limits to energy release and utilisation from chemical fuels," Nature 257 (1975) 367-370.

* cited by examiner

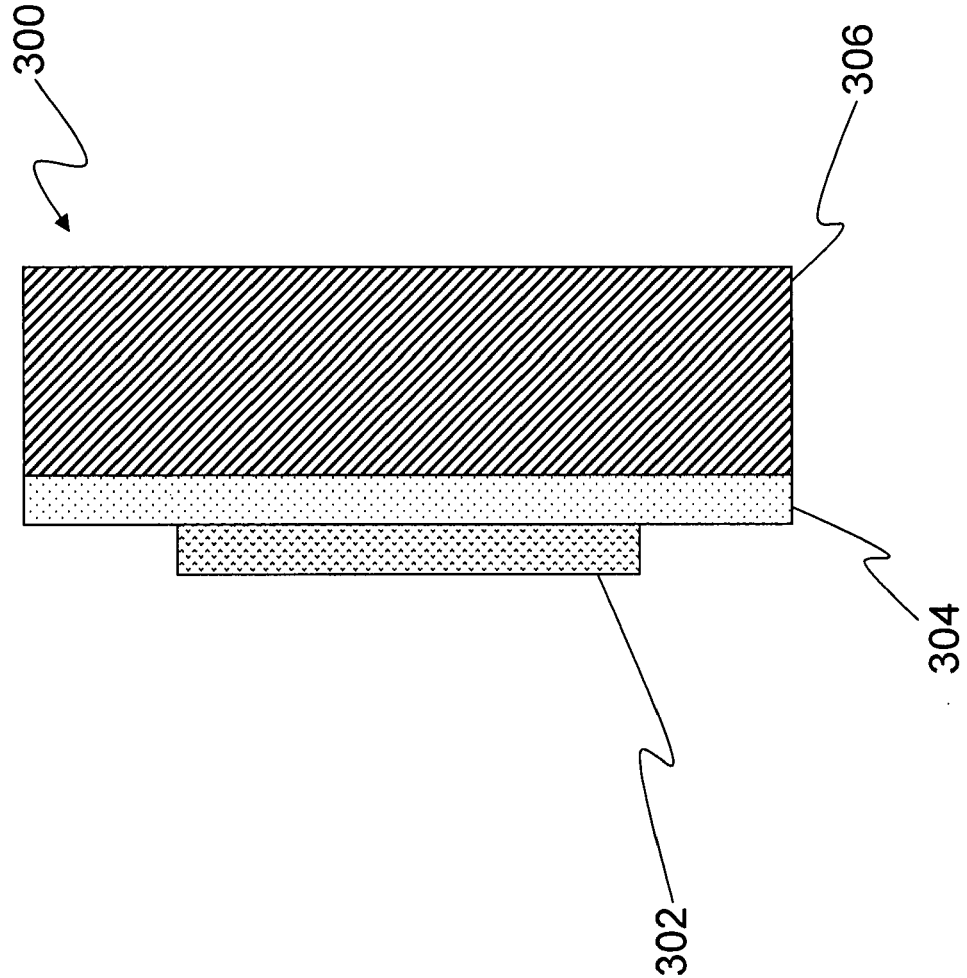

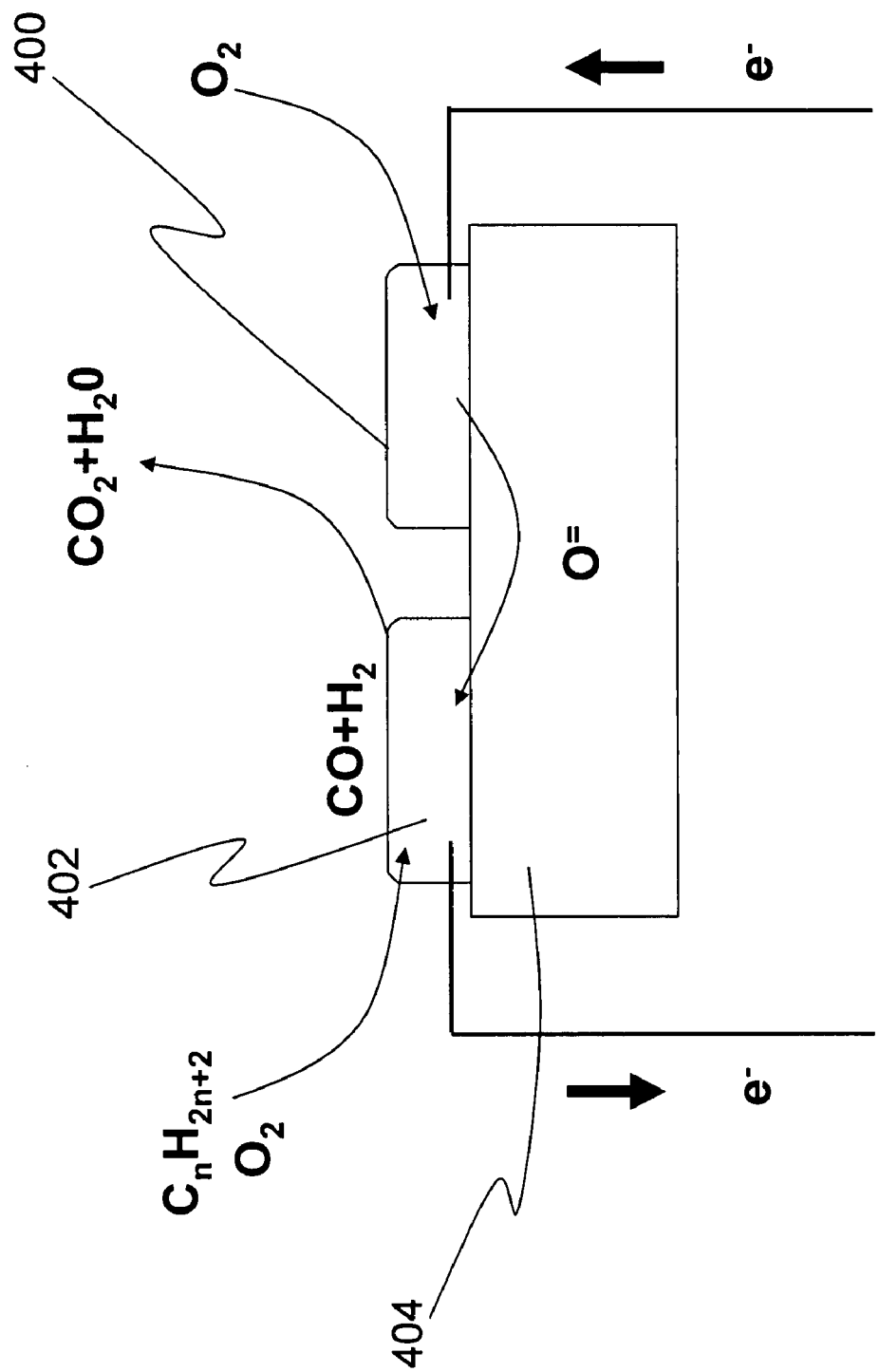

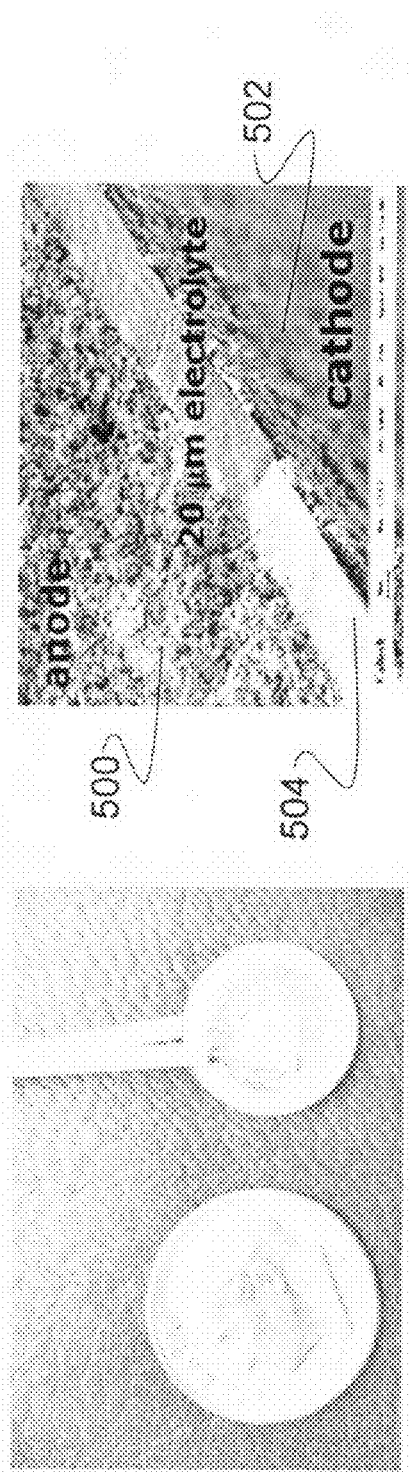
FIG. 5A
FIG. 5B
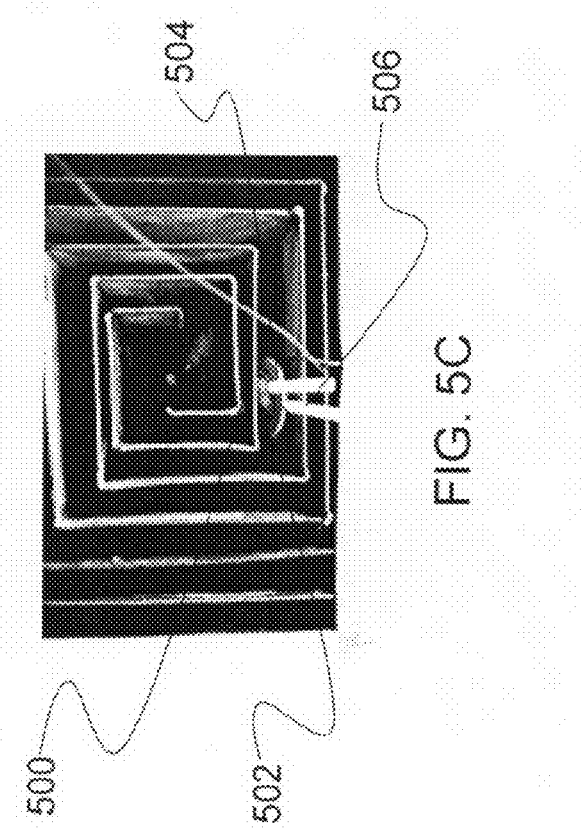
FIG. 5C
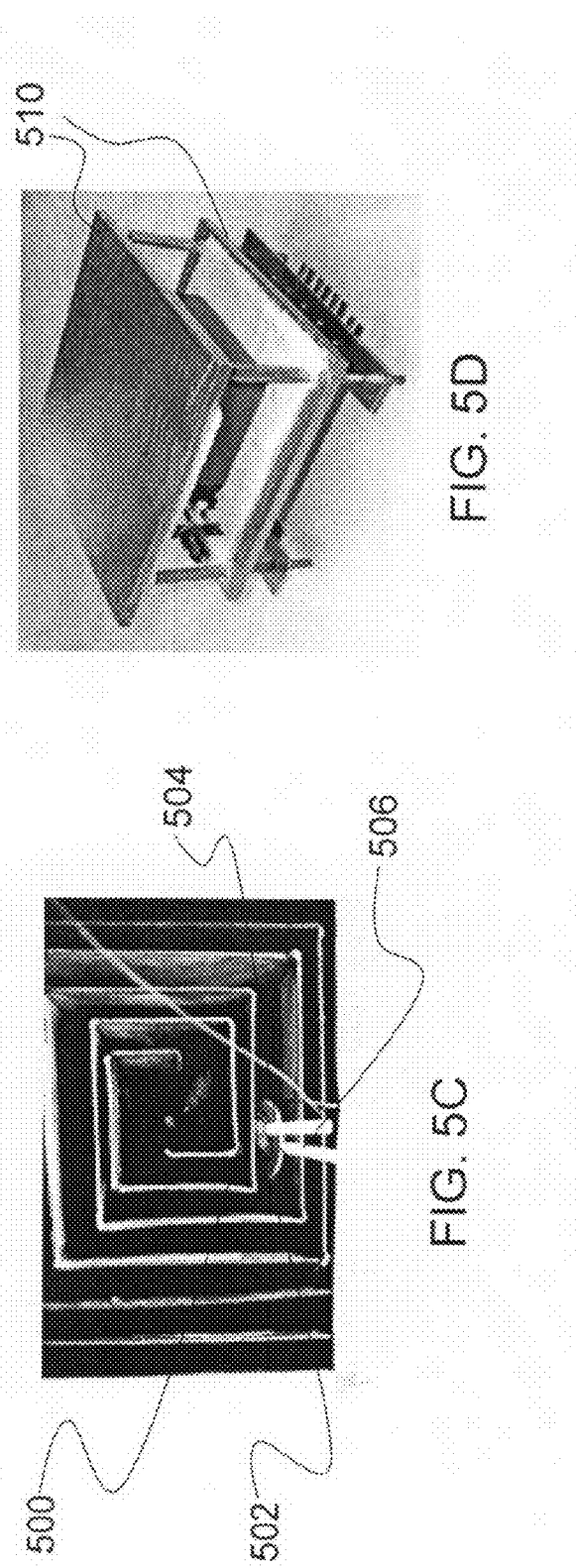
FIG. 5D

US 7,247,402 B2

POWER GENERATOR AND METHOD FOR FORMING THE SAME

PRIORITY CLAIM

The present application claims the benefit of priority of U.S. Provisional Patent Application No. 60/482,061, filed Jun. 23, 2003, entitled "Micro-SOFC in a 'swiss roll' heat exchanger."

STATEMENT OF GOVERNMENT INTEREST

This invention was made with government support under N66001-01-1-8966 awarded by the United States Navy. The government has certain rights in the invention.

BACKGROUND OF THE INVENTION (1) Technical Field

The present invention relates to a power generator. More specifically, the present invention relates to a solid oxide fuel cell encompassed by a spiral-wound heat exchanger and a method for forming the same.

(2) Description of Related Art

As the electronics industry's capability to manufacture small and powerful sensors, actuators, and functional devices increases, so does the demand for high-energy and/or power density microgenerators. Present-day lithium-ion batteries can deliver power densities on the order of 125 mW/cm3 (2000 mW/g) and thus often meet power density requirements of MicroElectroMechanical Systems (MEMS). However, energy densities of lithium-ion batteries, particularly when operated at the discharge rates required to obtain these power densities, are unacceptably low, and permit battery-powered microdevices to be operated only for limited periods of time. In contrast to lithium-ion batteries, which have energy densities of approximately 160 watt hours per kilogram (Wh/kg) or 350 watt hours per liter (Wh/l), liquid hydrocarbon fuels have exceptionally high energy densities, in the range of 10,000–15,000 watt hours per kilogram or 7,000–10,000 watt hours per liter. Thus, technologies which take advantage of inherently high energy densities of liquid hydrocarbon fuels are ideal for meeting increasing energy demands of the microelectronics industry. For example, a power generating device operating on propane and consisting of a fuel volume of fifty percent would only require a five percent fuel-to-electricity conversion efficiency to meet existing battery technology benchmarks. Such efficiency is easily achieved in a solid oxide fuel cell ("SOFC"). However, developing a SOFC for microelectronic applications presents several problems. Fabrication of micro-SOFCs is difficult and thermal management at such small-length scales is extremely challenging. SOFCs operate at temperatures of 300–1000 degrees Celsius, making their application in micro-devices problematic because of the difficulty overcoming the high rate of heat loss to the surroundings that occurs at such high temperatures in small devices. Therefore, the high rate of heat loss would make it difficult to generate heat at a rate faster than it is lost to the surroundings, which in turn would make it difficult to ignite fuel in the SOFC and generate a self-sustaining reaction.

Thus, a need exists in the art for a power generator that can be easily fabricated and can provide a high energy density and a sufficient degree of thermal management to reduce heat losses to a level whereby self-sustaining operation is possible, and whose size affords applicability in areas where space is limited.

SUMMARY OF THE INVENTION

The present invention provides for a power generator and method for forming the same. More specifically, the power generator comprises a chamber containing at least a portion of a solid oxide fuel cell ("SOFC"), with the chamber being encompassed by a spiral-wound counter-current heat exchanger. The SOFC comprises an anode; an electrolyte membrane connected with the anode; and a cathode connected with the electrolyte membrane. The spiral-wound counter-current heat exchanger includes walls that form a first passageway and an second passageway. Both the first passageway and the second passageway are connected with the chamber and run adjacent to one another in a spiral around the chamber and lead to an exterior of the power generator. The first passageway functions as a first inlet and the second passageway functions as an outlet. Reactants introduced into the power generator flow into the first inlet from the exterior of the power generator and past the SOFC where the reactants react to produce energy and reaction products. The reaction products thereafter leave the SOFC through the outlet and thereby transfer heat to incoming reactants in the adjacent inlet, and subsequently exit through the outlet.

The chamber is a chamber configuration selected from a group consisting of a single chamber containing both fuel and an oxidant, and at least two chambers, a first chamber being a fuel chamber and a second chamber being an oxidant chamber.

In another aspect, the power generator further comprises a reactor located downstream of the SOFC. The reactor is functional for converting reactants not reacted by the SOFC. Additionally, the reactor is a catalytic combustor. The catalytic combustor is formed of a material selected from a group consisting of platinum, palladium, and rhodium.

In yet another aspect, the spiral-wound counter-current heat exchanger further comprises a second inlet. The second inlet is configured in a configuration selected from a group consisting of being connected with the same chamber as the first inlet; being connected with a second chamber; and being introduced downstream of the SOFC and upstream of the reactor. When introduced downstream of the SOFC and upstream of the reactor, the second inlet is functional for introducing air into a reactant stream after the SOFC, but before the reactor. When the second inlet is connected with a second chamber, the spiral-wound counter-current heat exchanger further comprises a second outlet connected with the second chamber for allowing reaction products from reactants introduced into the second inlet to exit through the second outlet.

In another aspect, the SOFC is configured to operate using reactants from a group consisting of air, hydrogen, and hydrocarbon fuel.

In yet another aspect, the chamber further comprises at least one additional SOFC electrically connected with the SOFC, the combination constituting a series of SOFCs. Each SOFC in the series of SOFCs are electrically connected with at least one other SOFC through a series connection. A SOFC in the series of SOFCs is positioned such that its anode faces an anode from another SOFC, with its cathode facing the other SOFC's cathode, allowing the electrolyte to function as a barrier for gas diffusion between the anode and the cathode.

In another aspect, the power generator further comprises at least one nonconductive porous inter-connector positioned between a gap selected from a group consisting of space between two adjacent anodes and space between two adjacent cathodes. The porosity of the nonconductive porous inter-connector positioned between two adjacent cathodes differs from that of the porosity of the nonconductive porous inter-connector positioned between two adjacent anodes.

In yet another aspect, at least one SOFC in the chamber constitutes an upstream SOFC. The chamber further comprises at least one additional SOFC located downstream from the upstream SOFC. The downstream SOFC is positioned in the chamber such that its anode is aligned with the upstream cathode. Additionally, the downstream SOFC is positioned in the chamber such that its cathode is aligned with an upstream SOFC's anode. When positioned in this manner, reactants that did not react after having passed by the upstream SOFC thereafter pass by and react with the downstream SOFC.

Additionally, the anode and the cathode are connected with the electrolyte through a configuration selected from a group consisting of being directly connected with the electrolyte and of using walls of the spiral-wound counter-current heat exchanger as the anode and cathode electrodes.

Furthermore, the anode is comprised of a mixture of nickel and an oxygen ion conductor.

In another aspect, the electrolyte is constructed from a material selected from a group consisting of ceria, barium zirconate, bismuth oxide, lanthanum gallate, barium cerate, and zirconia.

In yet another aspect, the cathode is comprised of a mixed oxygen ion and electronic conductor.

Additionally, the cathode is constructed from a material selected from a group consisting of lanthanum strontium manganate, lanthanum strontium cobalt nickel oxide, and samarium strontium cobalt oxide.

In another aspect, the anode is constructed from a material selected from a group consisting of nickel-YSZ (yttria stabilized zirconia), nickel-doped ceria, a noble metal and nickel-YSZ, a noble metal and nickel-ceria, and combinations thereof.

In yet another aspect, the spiral-wound counter-current heat exchanger is constructed from a material having a thermal conductivity less than 2 watts per meter per Kelvin.

Additionally, the power generator further comprises a micro-aspirator in fluid communication with both the first inlet and the second inlet for controlling fuel and air flow being introduced to the SOFC; and an external battery electrically connected with the SOFC to allow for operative initiation of the power generator through resistive heating.

In another aspect, the cathode is formed of a perovskite of a general form $ABO_{3-\delta}$, wherein A is any cation with approximately a +2 charge and B is any cation with approximately a +4 charge, and of an electrolyte material compatible with the perovskite.

The perovskite takes the general form $(A'_{1-x}A''_x)BO_{3-\delta}$, wherein the average charge of A' and A" is approximately +2, and x is less than or equal to 1.

In another aspect, the perovskite takes the general form $A(B'_{1-y}B''_y)O_{3-\delta}$, wherein the average charge of B' and B" is approximately +4, and y is less than or equal to 1.

Additionally, the perovskite takes the general form $(A'_{1-x}A''_x)(B'_{1-y}B''_y)O_{3-\delta}$, wherein the average charge of A' and A" is approximately +2, and the average charge of B' and B" is approximately +4, and x and y are both less than or equal to 1.

Furthermore, A is any alkaline earth metal cation having approximately a +2 charge, and B is any transition metal cation having approximately a +4 charge.

In yet another aspect, A' and A" are any alkaline earth metal cations, the average charge of A' and A" is approximately +2, B is any transition metal cation with approximately a +4 charge, and x is less than or equal to 1.

Furthermore, A is any alkaline earth metal cation with approximately a +2 charge, B' and B" are any transition metal cations, the average charge of B' and B" is approximately +4, and y is less than or equal to 1.

Additionally, A' and A" are alkaline earth metal cations, the average of charge A' and A" is approximately +2, B' and B" are transition metal cations, the average charge of B' and B" is approximately +4, and both x and y are less than or equal to 1.

In another aspect, the perovskite takes the general form $(Ba_{1-x}A_x)BO_{3-\delta}$, wherein A is any alkaline earth metal cation other than Ba, the average charge of A and Ba is approximately +2, B is any transition metal cation having a charge of approximately +4, and x is less than or equal to 1.

Furthermore, the perovskite takes the general form $(Ba_{1-x}A_x)(B'_{1-y}B''_y)O_{3-\delta}$, wherein A is any alkaline earth metal cation other than Ba, the average charge of Ba and A is approximately +2, B' and B" are any transition metal cations, the average charge of B' and B" is approximately +4, and both x and y are less than or equal to 1.

The perovskite takes the general form $BaBO_{3-\delta}$, wherein B is any transition metal cation with approximately a +4 charge.

In another aspect, perovskite takes the general form $Ba_{1-x}Sr_xBO_{3-\delta}$, wherein B is any transition metal cation with approximately a +4 charge, and x is less than or equal to 1.

In yet another aspect, the perovskite takes the general form $Ba_{1-x}Sr_x(B'_{1-y}B''_y)O_{3-\delta}$, wherein B' and B" are any transition metal cations, the average charge of B' and B" is approximately a +4 charge, both x and y are less than or equal to 1.

Furthermore, the perovskite takes the general form $Ba_{1-x}Sr_xCoO_{3-\delta}$, wherein x is less than or equal to 1.

Additionally, the perovskite takes the general form $Ba_{1-x}Sr_xCo_{1-y}B_yO_{3-\delta}$, wherein B is any transition metal cation, the average charge of Co and B is approximately +4, and both x and y are less than or equal to 1.

In another aspect, the perovskite takes the general form $Ba_{1-x}Sr_xCo_{1-y}Fe_yO_{3-\delta}$, wherein x and y are both less than or equal to 1.

In yet another aspect, the perovskite takes the general form $Ba_{0.5}Sr_{0.5}Co_{0.8}Fe_{0.2}O_{3-\delta}$.

In another aspect, the electrolyte is present in the cathode in a positive amount up to approximately 40% by weight of the total weight of the cathode.

Additionally, the cathode further comprises a precious metal, the precious metal being selected from a group consisting of Ag, Au, Pt, Pd, or mixtures thereof. The precious metal is present in the cathode material in a positive amount up to approximately 60% by weight of the total weight of the cathode.

Additionally, the electrolyte material is selected from a group consisting of samaria doped ceria, gadallium doped ceria, Sc doped zirconia, yttria doped zirconia and lanthanum strontium sallium manganese oxide perovskites.

It can be appreciated by one in the art that the present invention also comprises a method for forming the power generator. For example, the method comprises acts of forming a solid oxide fuel cell (SOFC); forming a spiral-wound counter-current heat exchanger such that the heat exchanger encompasses the SOFC; and forming a reactor downstream of the SOFC.

The act of forming the SOFC further comprises an act of selecting an active material for use as the cathode electrode. The active material selected being a perovskite of a general form $ABO_{3-\delta}$, wherein A is any cation with approximately a +2 charge and B is any cation with approximately a +4 charge, and an electrolyte material compatible with the perovskite.

Finally, it can be appreciated by on in the art that the present invention also comprises a method for power generation using the power generator described herein.

BRIEF DESCRIPTION OF THE DRAWINGS

The objects, features and advantages of the present invention will be apparent from the following detailed descriptions of the preferred aspects of the invention taken in conjunction with reference to the following drawings, where:

FIG. 3 is an illustration of an anode-supported SOFC;

FIG. 4A is an illustration of a single chamber SOFC;

FIG. 5A is a magnified photograph demonstrating the size of the SOFC;

FIG. 5B is a magnified photograph depicting the layers of the SOFC;

FIG. 5C is a magnified photograph depicting external leads that connect the fuel cell to a device to be powered by the power generator;

FIG. 5D is a photograph depicting a mount for the power generator;

DETAILED DESCRIPTION

The present invention relates to a power generator. More specifically, the present invention relates to a solid oxide fuel cell ("SOFC") encompassed by a spiral-wound heat exchanger, and a method for forming the same. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art and the general principles, defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

(1) Introduction

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

The description outlined below sets forth a power generator and method for forming the same, the power generator containing a solid oxide fuel cell ("SOFC") surrounded by a spiral-wound heat exchanger.

(2) Discussion—Power Generator

Power generators made with SOFCs according to the present invention are capable of producing exceptionally high energy densities; in the range of 10,000–15,000 watt hours per kilogram (Wh/kg). In contrast to lithium-ion batteries, which produce approximately 160 Wh/kg, SOFCs have far superior energy densities.

The spiral-wound design of the heat exchanger allows for a longer thermal path over which the incoming cold reactants can absorb heat from the exiting products of the reaction, thus minimizing the external temperature, heat losses, and thermal signature of the power generator.

Figure 1A:
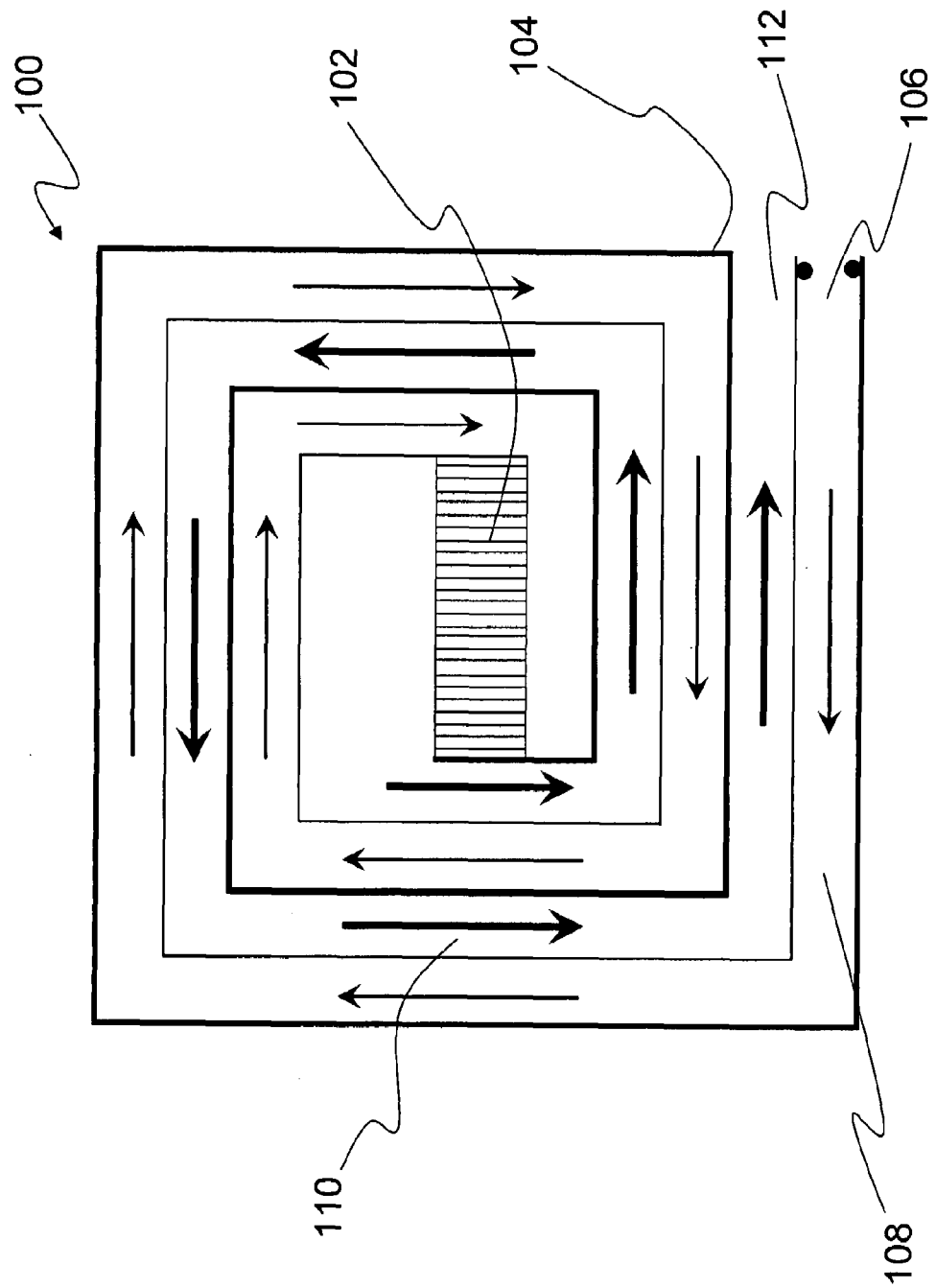
FIG. 1A is an illustration of a power generator according to the present invention, with a solid oxide fuel cell ("SOFC") surrounded by a spiral-wound heat-exchanger.

A non-limiting example of a design of a power generator 100 is illustrated in FIG. 1A. In one embodiment, the power generator 100 is a SOFC 102, surrounded by a spiral-wound heat exchanger 104. The spiral-wound heat exchanger 104 is a counter-current heat exchanger, allowing exiting products to transfer heat to incoming reactants. The reactants for the SOFC 102 enter through an inlet 106 on the outer edge of the heat exchanger and travel down a pathway 108 until they reach the SOFC 102 in the center chamber. Here, the fuel and oxidant reactants mix in the SOFC 102, generating the energy and releasing byproducts of the reaction. The byproducts of the reaction then travel a pathway 110, and then exit through an outlet 112.

Figure 1B:
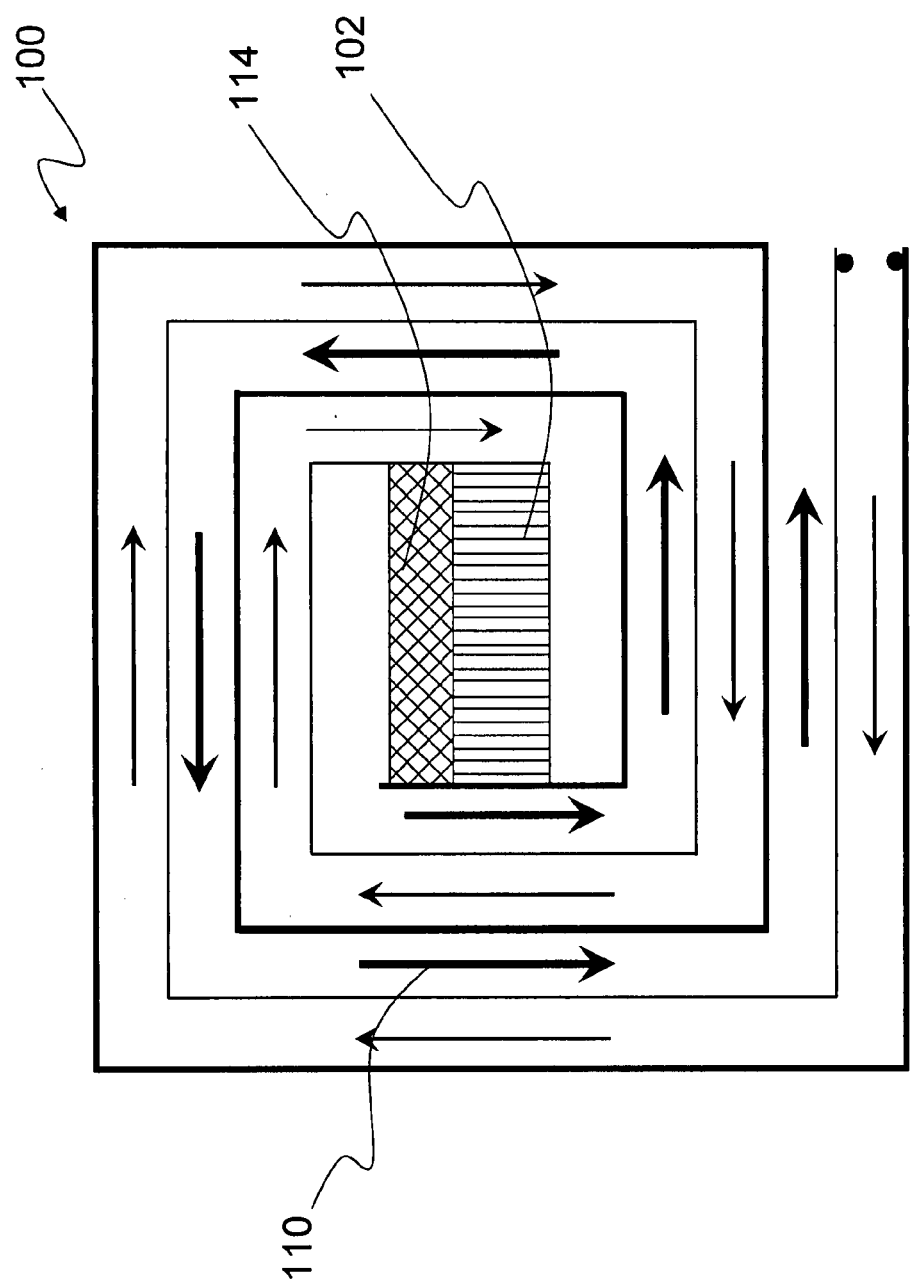
FIG. 1B is an illustration of another embodiment of the power generator with a reactor placed downstream from a SOFC.

In one aspect of the invention, as illustrated in FIG. 1B, the byproducts of the SOFC reaction pass through a reactor 114 to completely oxidize any remaining reactants. The reactor 114 is simply placed downstream from the SOFC 102 at any point along the exit pathway 110, allowing unreacted reactants to pass by the reactor 114 after leaving the SOFC 102.

Figure 1C:
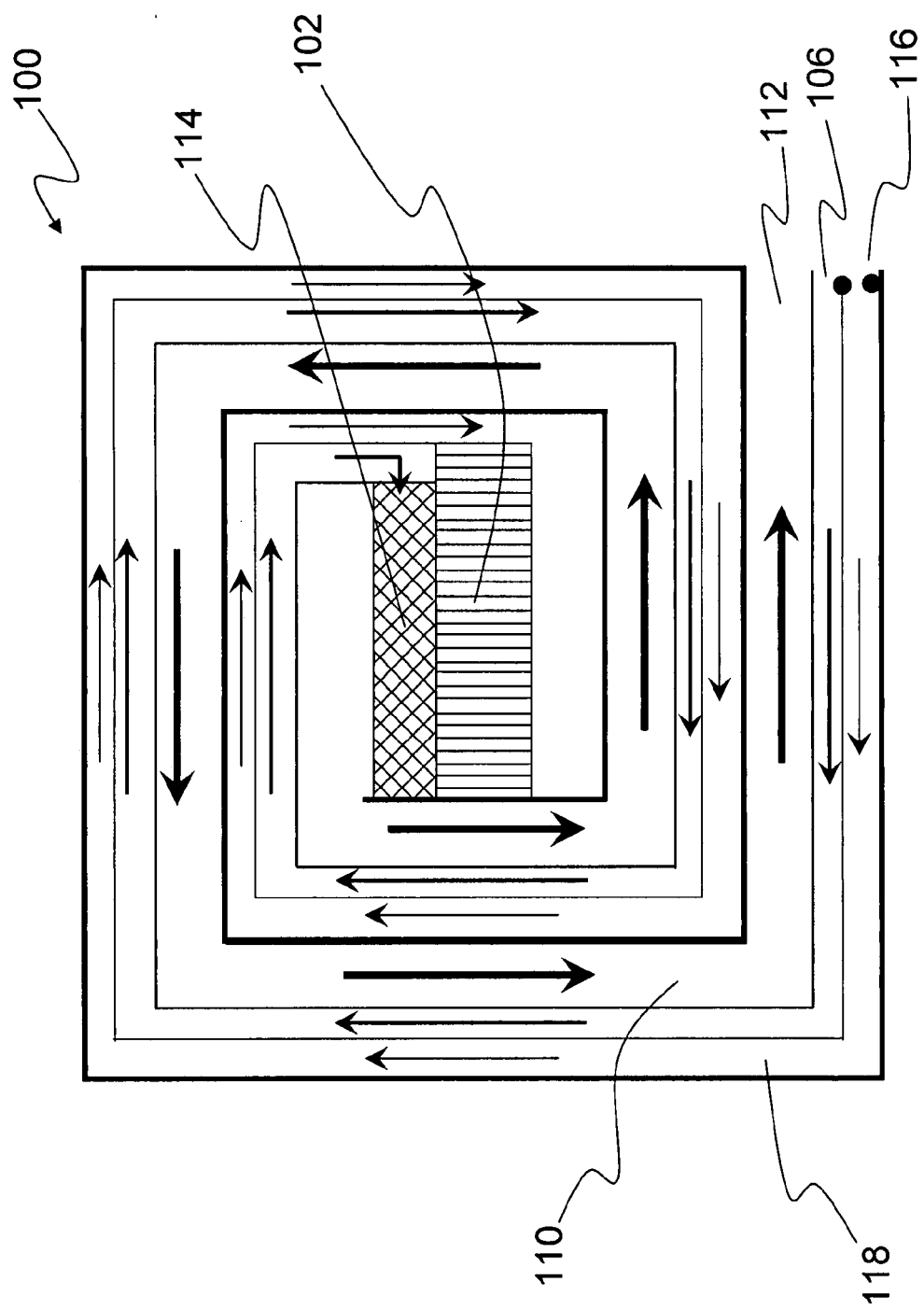
FIG. 1C is an illustration of a further embodiment of the power generator depicting a separate air intake pathway for the reactor.

In still another aspect, as illustrated in FIG. 1C, the reactor 114 is fed air through a second inlet 116 and pathway 118. The addition of air through the second inlet 116 increases the efficiency of the reactor 114 in eliminating excess reactants. Thereafter, the products of the reaction continue along the exit pathway 110 until they exit the power generator through the outlet 112.

In the typical fuel cell, the anode consumes fuel while the cathode consumes oxygen, producing the byproducts of $CO_2$ and $H_2O$, as demonstrated below:

Cathode $$\tfrac{1}{2}O_2 + 2e^- \rightarrow O^{2-}$$

Anode $$H_2 + O^{2-} + 2e^- \rightarrow H_2O$$

$$CO + O^{2-} + 2e^- \rightarrow CO_2$$

Figure 2A:
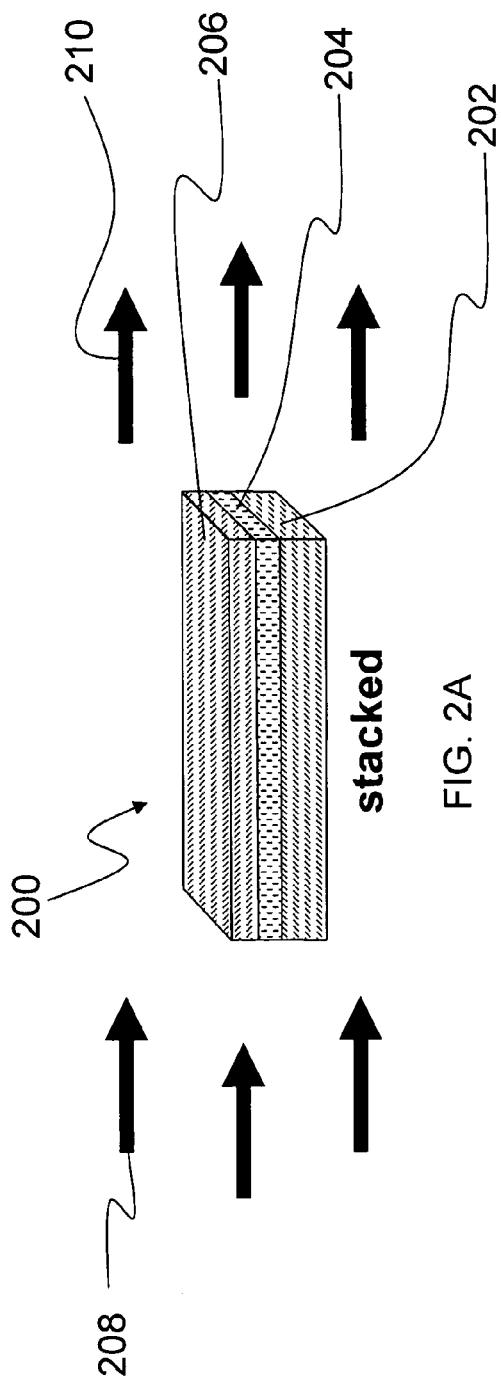
FIG. 2A is an illustration of a stacked geometry of the SOFC.

In one aspect, a fuel cell 200 is generally configured in a stacked configuration, as illustrated in FIG. 2A. In the stacked position, an anode 202 is attached with an electrolyte layer 204, and the electrolyte layer 204 is connected with a thin cathode layer 206, thereby positioning the electrolyte layer 204 between the anode 202 and the cathode 206. In this configuration, fuel and oxidants 208 react with the entire stack, releasing byproducts 210.

Figure 2B:
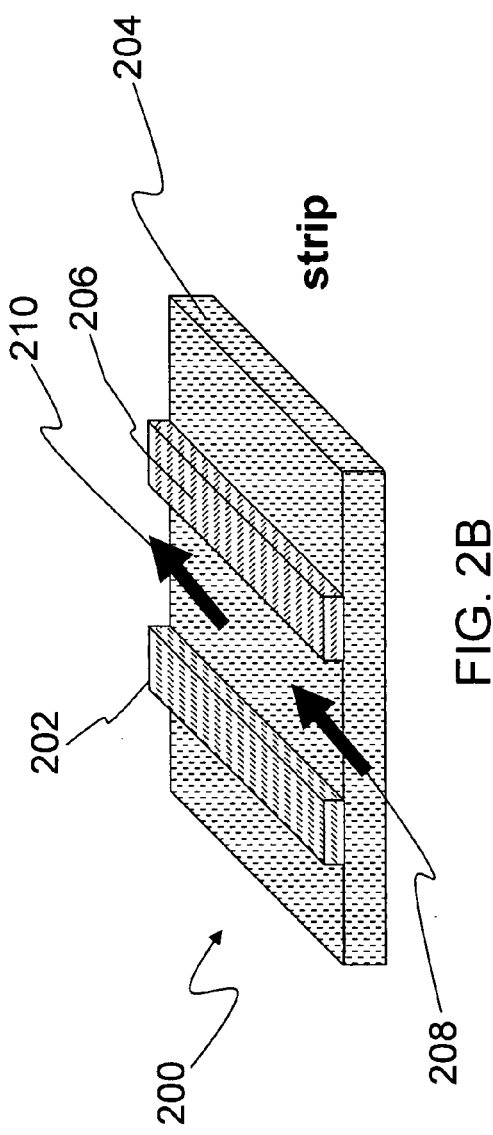
FIG. 2B is an illustration of a strip geometry of the SOFC.

In yet another aspect, a fuel cell 200 is formed in a strip configuration, as illustrated in FIG. 2B. In this strip configuration, an anode strip 202 is connected with an electrolyte layer 204 and a cathode strip 206 is connected with the electrolyte layer 204 in a position parallel to the anode strip 202. As indicated by the arrows, the fuel and oxidants 208 pass over the electrolyte layer 204, between the anode strip 202 and cathode strip 206, where the released byproducts 210 of the reaction exit the fuel cell configuration.

In order to minimize losses across the fuel cell electrolyte, it is necessary for the electrolyte membrane to be as thin as possible. Thus, the electrolyte membrane is mechanically supported by one of two electrodes, desirably the anode. The preferred materials permit that neither electrode material reacts with the electrolyte, so that the entire structure of the SOFC can be fabricated in a single step.

In one embodiment, an anode-supported fuel cell is used. As illustrated in FIG. 3, a SOFC 300 comprises a thin cathode layer 302 formed on the first side of an electrolyte layer 304, with a thick anode layer 306 formed on the second side of an electrolyte layer 304 to complete the structure of the solid oxide fuel cell.

In another embodiment, the fuel cell may be of the single chamber type, in which fuel and oxidant are combined into a single chamber. The Single Chamber Fuel Cell ("SCFC") offers better fabrication simplicity than a standard dual-chamber fuel cell because the oxidant and fuel need not be physically isolated. This gain in simplicity comes at the expense of lower fuel utilization, and thus, in such a design, fuel not consumed in the fuel cell will be combusted using a reactor such as a catalytic combustor. The heat generated by the reactor also serves to maintain the temperature of the fuel cell and to minimize emissions, possibly preventing detection in situations where secrecy is of importance. The typical SCFC is illustrated in FIG. 4A. The single chamber fuel cell ("SCFC") comprises a cathode 400, an anode 402, and a connecting electrolyte membrane 404. As the cathode 400 consumes $O_2$, the anode 402 consumes the fuel, resulting in the byproducts of $CO_2$ and $H_2O$. The SCFC can be fabricated in either a strip configuration, as implied in FIG. 4A and shown explicitly in FIG. 2B, or in a stacked configuration, as shown in FIG. 2A.

Figure 4B:
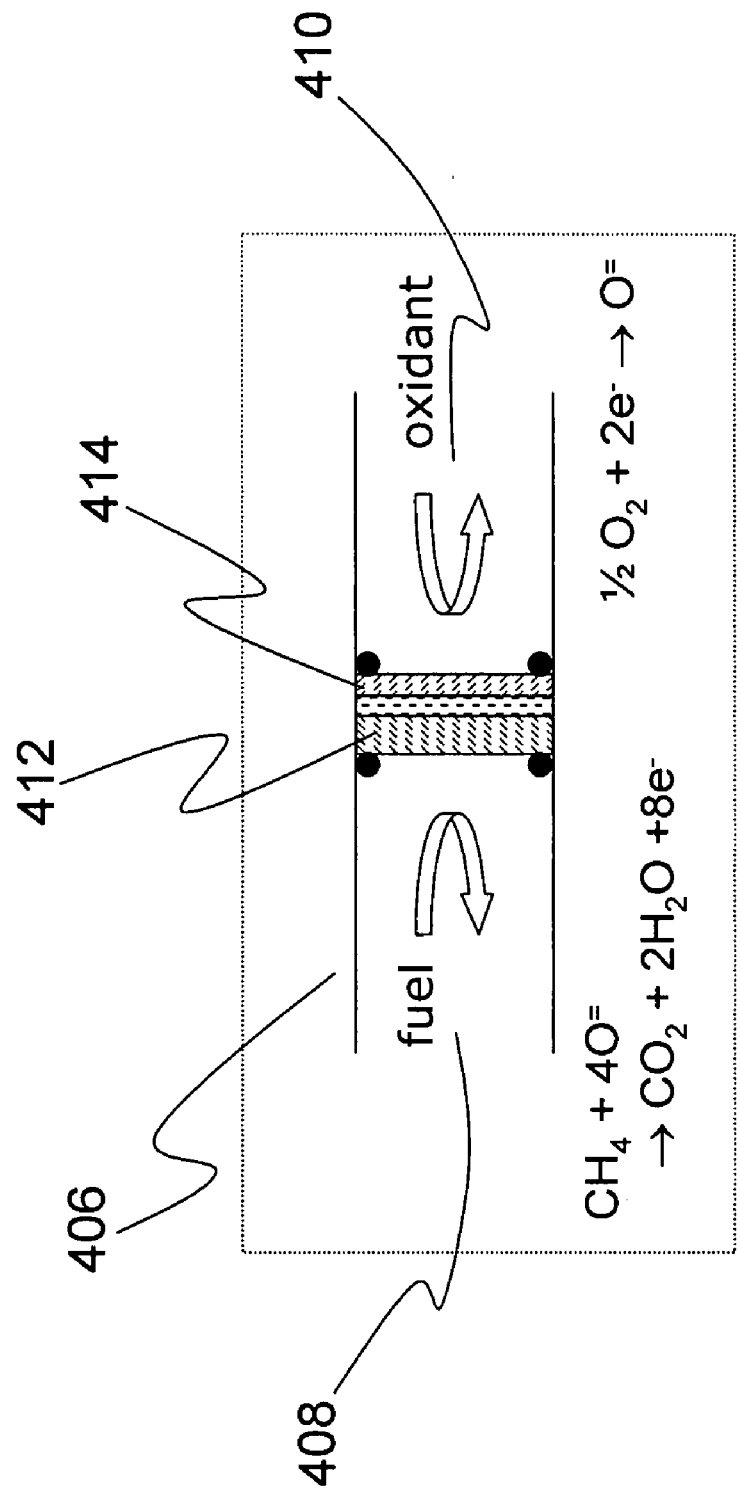
FIG. 4B is an illustration of a dual chamber SOFC.

In another embodiment, a fuel cell may be of the conventional dual-chamber fuel cell type, with two isolated fuel and oxidant chambers, as illustrated in FIG. 4B. An anode chamber 408 contains the fuel, while a cathode chamber 410 contains the oxidant. When oxidant enters the cathode chamber 410, the reaction begins, creating a charge balance along an anode 412 and a cathode 414, and producing, by the same processes as above, the byproducts of $CO_2$ and $H_2O$. This dual-chamber fuel cell is the conventional configuration of operating a fuel cell, but has limitations in the applicability to a small environment with a heat exchanger.

Figure 4C:
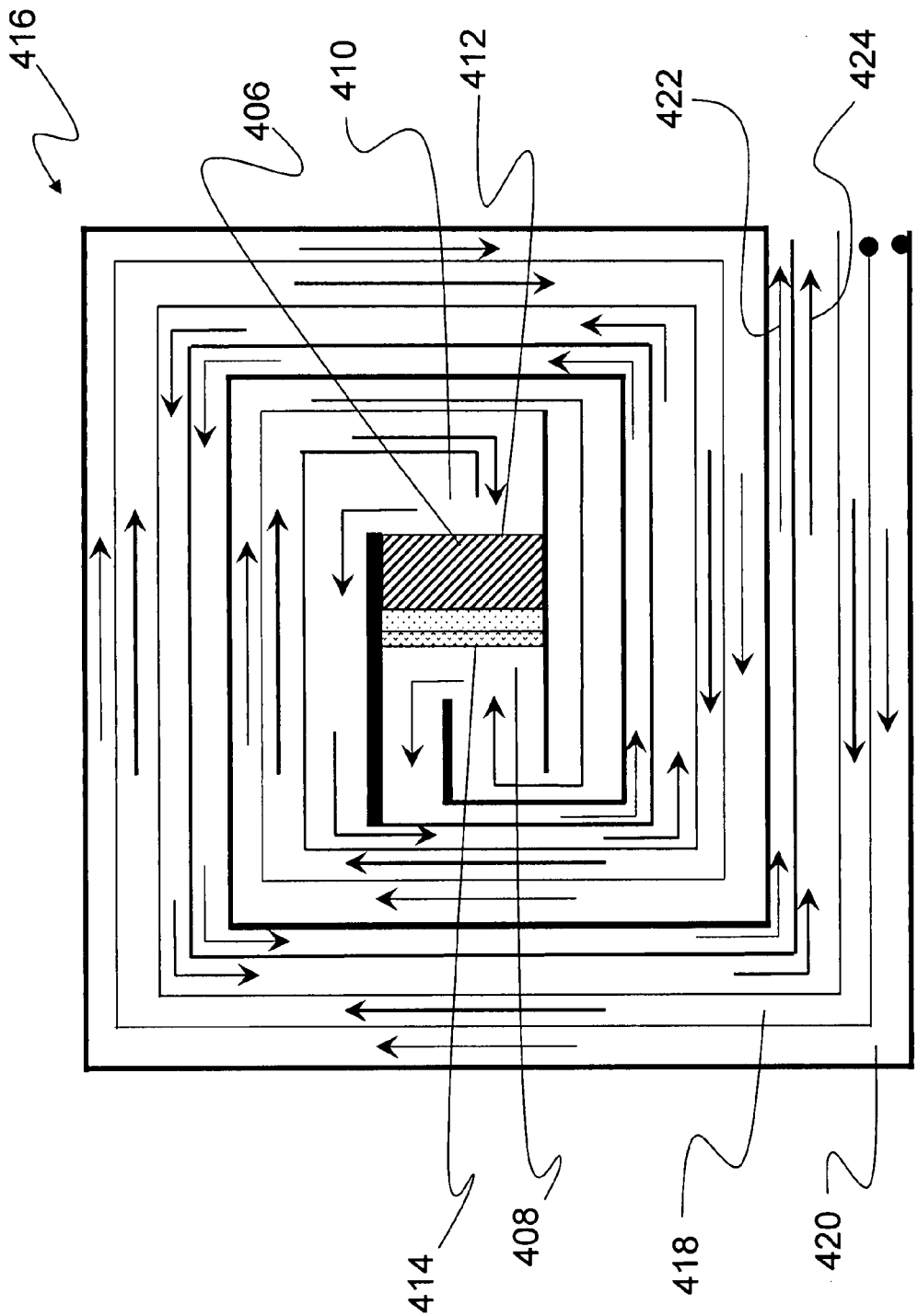
FIG. 4C is an illustration of a yet further embodiment of the power generator depicting separate pathways for the reactant materials to feed a dual chamber fuel cell, along with separate exit pathways for the byproducts of the reaction.

Use of the dual-chamber fuel cell configuration requires keeping the fuel and oxidant materials separate, which requires additional pathways in the heat exchanger to carry the fuel and oxidant separately. One embodiment of a power generator with a dual-chamber fuel cell is illustrated in FIG. 4C. In this diagram, a power generator 416 contains additional intake pathways leading to the dual-chamber fuel cell 406, a fuel pathway 418, and an oxidant pathway 420. The fuel pathway 418 reaches the fuel chamber 408, and the oxidant pathway 420 reaches the oxidant chamber 410, where the materials then react and produce the aforementioned byproducts. The byproducts of the reaction then exit through separate exit pathways 422 and 424. This embodiment requires significant more effort to fabricate the additional pathways.

Figure 4D:
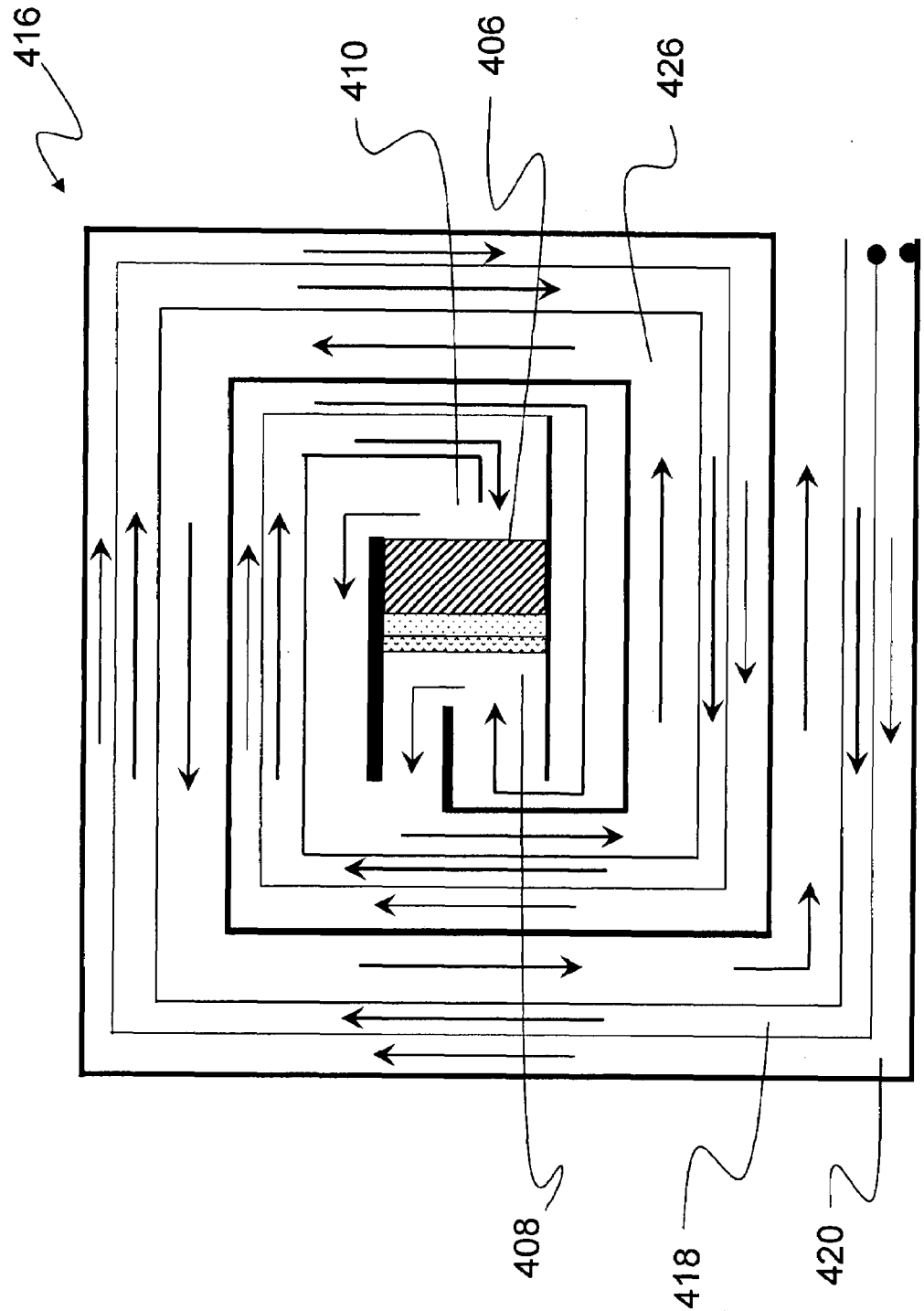
FIG. 4D is an illustration of still another embodiment of the power generator depicting separate pathways for the reactant materials to feed a dual chamber fuel cell, along with a single exit pathway for the byproducts of the reaction.

In yet another embodiment, the separate exit pathways can be eliminated to leave only one exit pathway for the byproducts of the reactant, as illustrated in FIG. 4D. In this embodiment, the fuel and oxidant enter through separate pathways 418 and 420, respectively, but after the reaction of the materials in the fuel chamber 410 and oxidant chamber 408 of the fuel cell 406, the byproducts leave through a single exit pathway 426. This embodiment provides for a simpler method of fabricating the power generator, but still requires more effort than the SCFC design of FIG. 1A.

Thus, fabricating the dual chamber fuel cell and corresponding heat exchanger is more complex, as it requires an additional pathway to separately intake the fuel and oxidant materials.

The composition of the anode, cathode, and electrolyte materials is determined by the operating temperatures of the fuel cell. For a reduced operating temperature of 300–700 degrees Celsius, the performance requirements of the cathode and anode increase significantly. For example, they must be chemically compatible with the electrolyte such that co-firing of the three components in the membrane electrode assembly is possible. For high-temperature fuel cells, non-limiting examples of standard anode and cathode materials can be used.

The anode is typically comprised of a mixture of nickel and an oxygen ion conductor, for example, nickel yttria stabilized zirconia (YSZ), and nickel-doped ceria. In addition, a noble metal can be included in the anode mixture. The noble metal can be platinum, palladium, rhodium, or ruthenium, or mixtures or alloys thereof.

Non-limiting examples of cathode materials include barium strontium cobalt iron oxide, lanthanum strontium manganate, lanthium strontium cobalt nickel oxide, and samarium strontium cobalt oxide. Additionally, the cathode may be formed of a perovskite of a general form $ABO_{3-\delta}$, wherein A is any cation with approximately a +2 charge and B is any cation with approximately a +4 charge, and of an electrolyte material compatible with the perovskite. This embodiment of the cathode is further described in U.S. patent application Ser. No. 10/861,828 (pending), incorporated herein by reference The electrolyte can be constructed of doped ceria or doped barium zirconate. When suitably doped, these materials exhibit ionic conductivity on the order of $10^{-2}$ ohms$^{-1}$ cm$^{-1}$ at 500 degrees Celsius, with an ionic transference number close to one. Other materials such as bismuth oxide, lanthanum gallate, or barium cerate exhibit high conductivities, but suffer from poor chemical stability in the fuel cell environment. Compositions in the barium zirconate-barium cerate system combine good conductivity with good chemical stability (with respect to reaction with $CO_2$ byproduct) and such compositions are therefore also suitable for intermediate temperature fuel cell applications. For higher temperature operations (e.g., 700–1000 degrees Celsius), stabilized zirconia can be utilized as the electrolyte.

The reactor may be constructed of any suitable material for catalyzing the reaction of the residual reactants with one another. As a non-limiting example, the reactor is a catalytic combustor constructed from materials such as platinum, palladium, and rhodium. In particular, platinum exhibits desirable properties for combustion of typical fuel materials such as methane, butane, or propane. Platinum provides the widest range of steady operating conditions, such as fuel concentration, mixture flow velocity and Reynolds numbers, and the widest range of combustion temperatures. Additionally, the self-ignition temperatures are critical for initiating device operation as low as 200 degrees Celsius for the fuels of interest on platinum catalysts.

In operation, the catalytic combustor must oxidize unspent fuel as well as carbon monoxide. This can be achieved through the introduction of tin as an alloying element to platinum or palladium. Supporting oxides such as zirconia, alumina and ceria can also greatly enhance activity by providing additional molecule binding sites and sources of oxygen. These materials can be used to improve catalyst activity.

The power generator can be fabricated in a wide range of sizes. For illustrative purposes, several non-limiting examples of fabricated fuel cells and corresponding heat exchangers are demonstrated in FIGS. 5A–5D. FIG. 5A shows an example of the fuel cell as fabricated at a total area of about 2.5 centimeters squared (cm$^2$), while FIG. 5B shows a microscopic view of the fuel cell, with an anode layer 500, cathode layer 502, and electrolyte layer 504 between the anode layer 500 and cathode layer 502. FIG. 5C is a photograph of the entire power generator device, with the fuel cell placed near the center of the heat exchanger and connected to external leads 506 and 508 to carry the generated energy to the device to be powered. The power generator device can be placed between plates 510 to cement the device, as illustrated in FIG. 5D. Furthermore, in a typical embodiment, the anode and cathode can be connected to an external battery to initiate the system through resistive heating.

Figure 6:
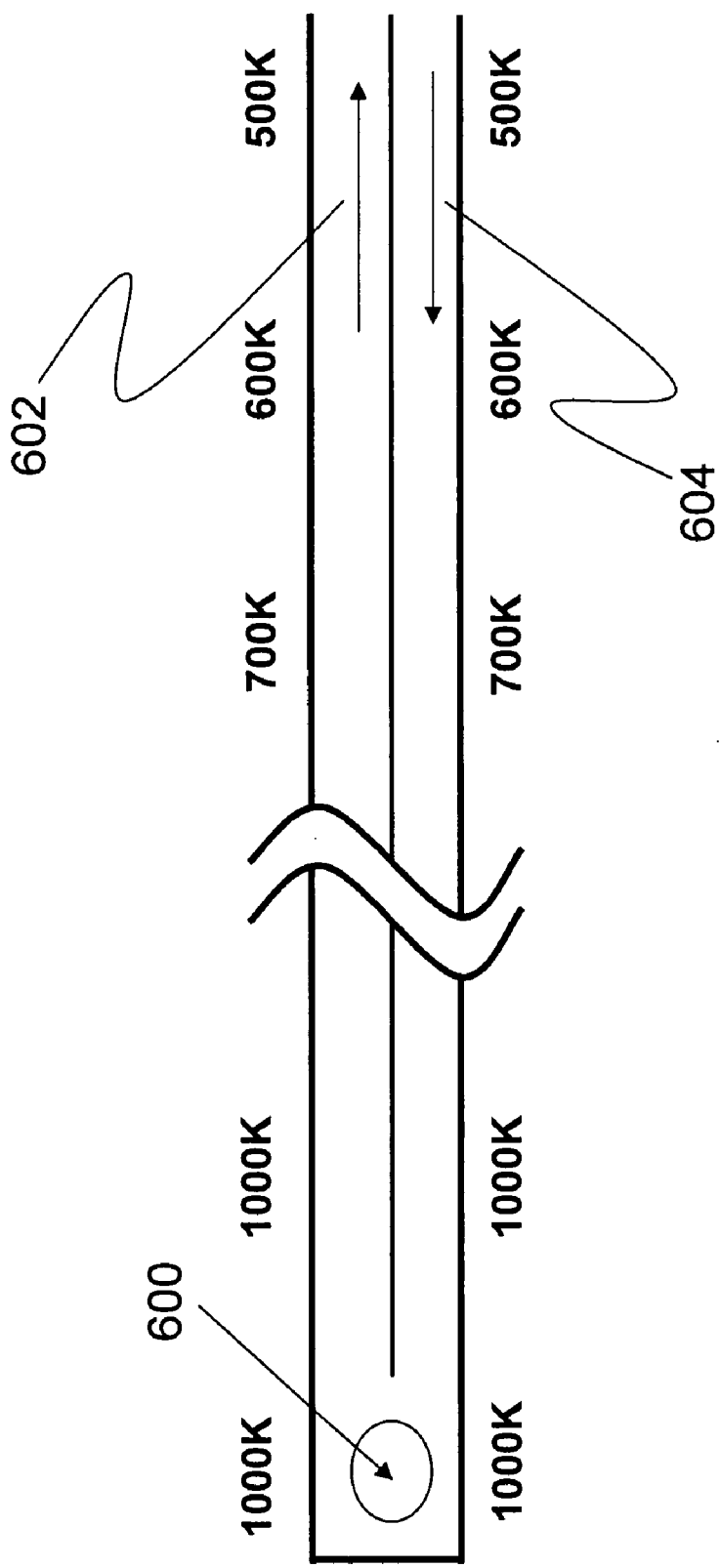
FIG. 6 is a schematic illustration of a spiral-wound power generator, which has been unwound for clarity to show the temperatures experienced in the generator.

FIG. 6 demonstrates the thermal transfer properties of the spiral-wound heat exchanger, which has been unwound for clarity to show the temperatures experienced in the generator. Reactants 604 moving into the heat exchanger and toward a central SOFC 600 gradually heat up at the same rate that the outgoing products 602 of the reaction cool down. The typical heat exchanger is constructed from a material having a thermal conductivity of less than 2 watts per meter Kelvin (w/mK). A non-limiting example is tungsten carbide with ten percent cobalt, which provides for ease of fabrication and a current path from the SOFC. In operation, the device may be constrained by plates on the top and bottom of the heat exchanger. Using a typical catalyst, combustion can be sustained over a wide range of Reynolds numbers and mixture ratios, with temperatures of 300–500 degrees Celsius readily obtainable.

Non-limiting examples of fuels utilized in this configuration include hydrogen, butane, propane, ammonia, ethane, and dimethyl ether.

Figure 7:
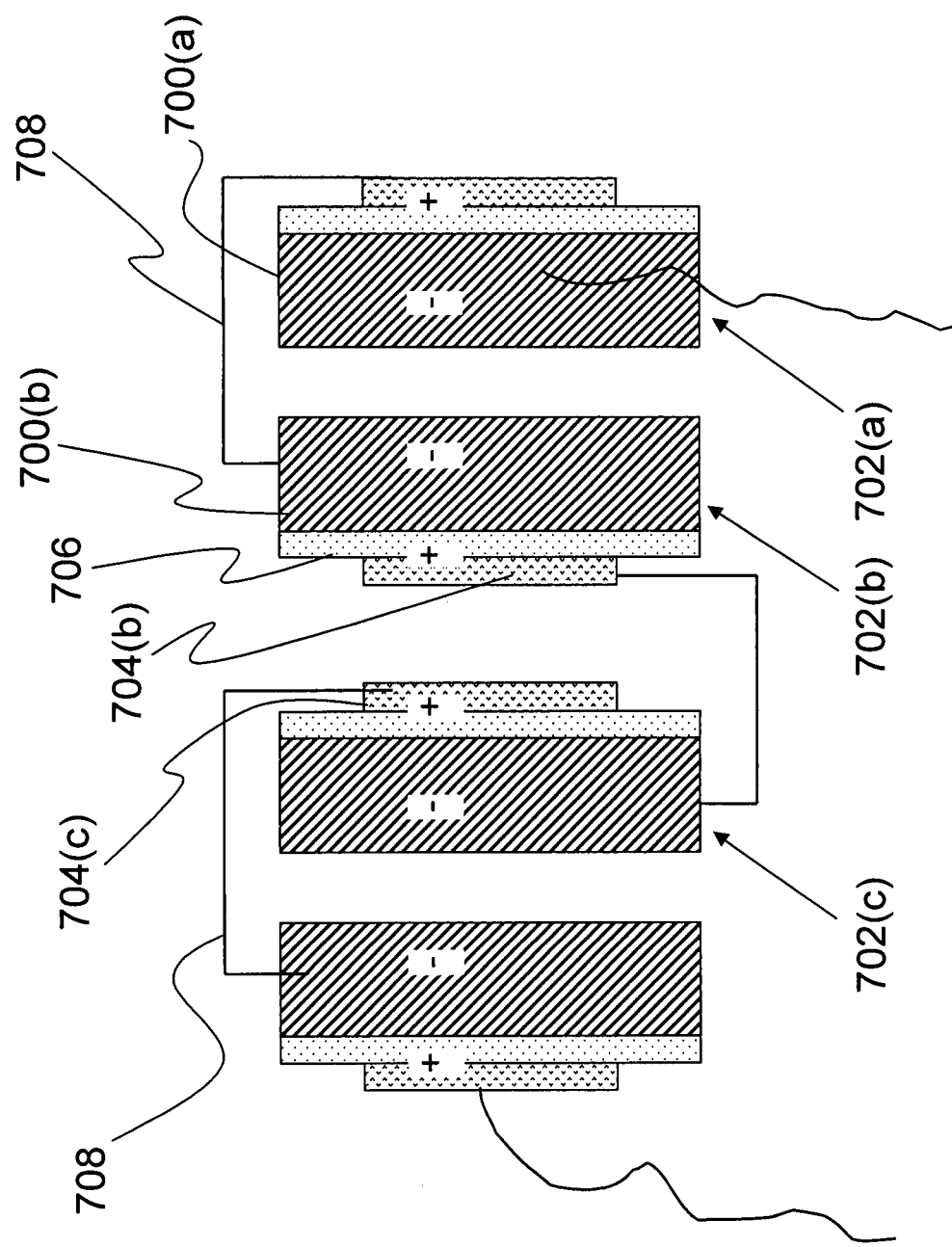
FIG. 7 is an illustration of a stacked configuration of SOFCs.

In another embodiment of the present invention, a series of SOFCs are linked together through an electrical connection in order to increase the efficiency of the device. The series configuration of SOFCs is depicted in FIG. 7. In this configuration, as a non-limiting example, an anode layer 700(a) of one SOFC 702(a) faces an anode layer 700(b) of another SOFC 702(b) in a parallel fashion. Likewise, the cathode layer 704(b) of an SOFC 702(b) thus faces the cathode layer 704(c) of a parallel SOFC 702(c). The electrolyte layer 706 thus acts as a buffer to prevent gas diffusion between the anode and cathode. The multiple SOFCs are then electrically connected through a series of connections 708 that run from the anode layers 700(b) of one SOFC 702(b) to the cathode layers 704(a) of the following SOFC 702(a). In this embodiment, non-conductive porous ceramic interconnectors can be placed in the gaps between anode layers or cathode layers of parallel SOFCs to give the stack of SOFCs more mechanical strength. The porosity of the interconnector can be altered for each anode or cathode gap to better suit the nature of the reaction occurring in that gap. For example, the interconnector between the cathode gap should be more porous to allow enough oxygen for the cathode. If smaller amounts of gas pass through the anode gap, smaller amounts of $H_2$ and CO are produced, thus decreasing the amount of $H_2$ and CO gas diffusing across the electrolyte layer, which subsequently preserves the efficiency of the operation. Additionally, because the cathode layer has a minimum gas diffusion resistance, it is desirable to use an even number of SOFCs so that the cathode layer will always face the outside of the stack, rather than the anode layer.

Figure 8:
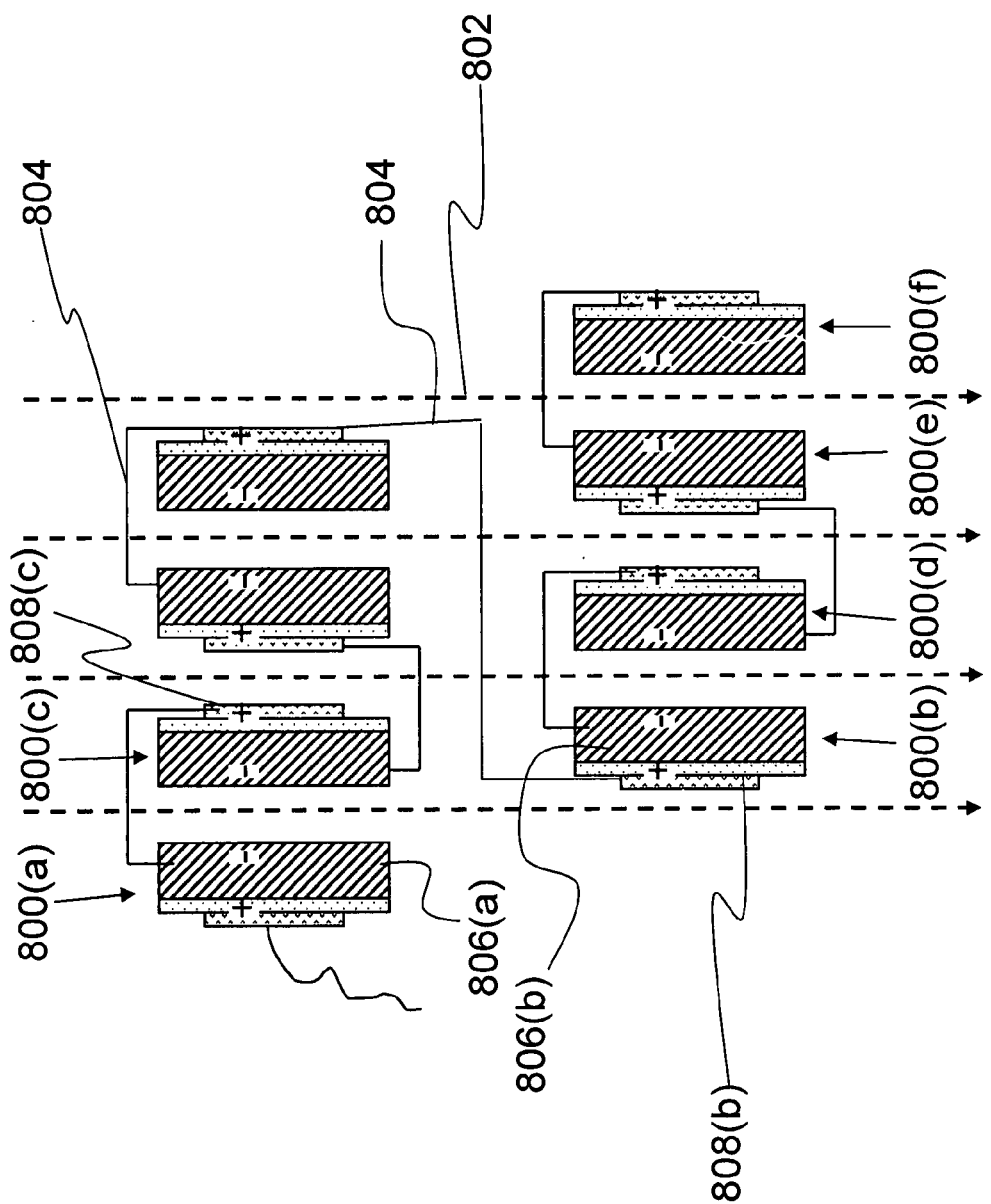
FIG. 8 is an illustration of a stacked configuration of SOFCs with an additional set of stacked, downstream SOFCs.

In another embodiment of the SOFC stack, additional SOFCs can be added downstream from the original SOFC stack to aid in the electrochemical consumption of unspent fuel. This configuration is illustrated in FIG. 8. In this configuration, at least one SOFC 800(a) is present upstream of the flow of materials, with at least one additional SOFC 800(b) located downstream of the original SOFC 800(a). The flow of the reactants 802 is shown to indicate the positioning of the upstream SOFC 800(a) and the downstream SOFC 800(b). A micro-aspirator can be connected with both the first inlet and the second inlet for controlling fuel and air flow being introduced to the SOFC. The SOFCs are electrically connected through a series connection 804. The downstream SOFC 800(b) can be placed in any suitable manner to aid in burning of unspent fuel. For example, as depicted in FIG. 8, the anode layer 806(a) of the upstream SOFC 800(a) can be positioned in the chamber to align with the cathode layer 808(b) of the downstream SOFC 800(b). The anode layer 806(a) of the upstream SOFC 800(a) consumes fuel, leaving un-reacted oxygen that is consumed by the aligned cathode layer 808(b) of the downstream SOFC 800(b). Similarly, the cathode layer 808(c) of the upstream SOFC 800(c) consumes oxygen, leaving un-reacted fuel that is consumed by the aligned anode 806(b) of the downstream SOFC 800(b). As depicted in FIG. 8, an unlimited number of downstream SOFCs 800(d)–(f) can be added to the chamber to increase the efficiency of the power generator.

(3) Method for Forming the Power Generator

In order to minimize the resistive losses across the fuel cell electrolyte, it is essential to minimize the electrolyte thickness. Ultrathin electrolyte membranes must be mechanically supported on one of the two electrodes.

Figure 9:
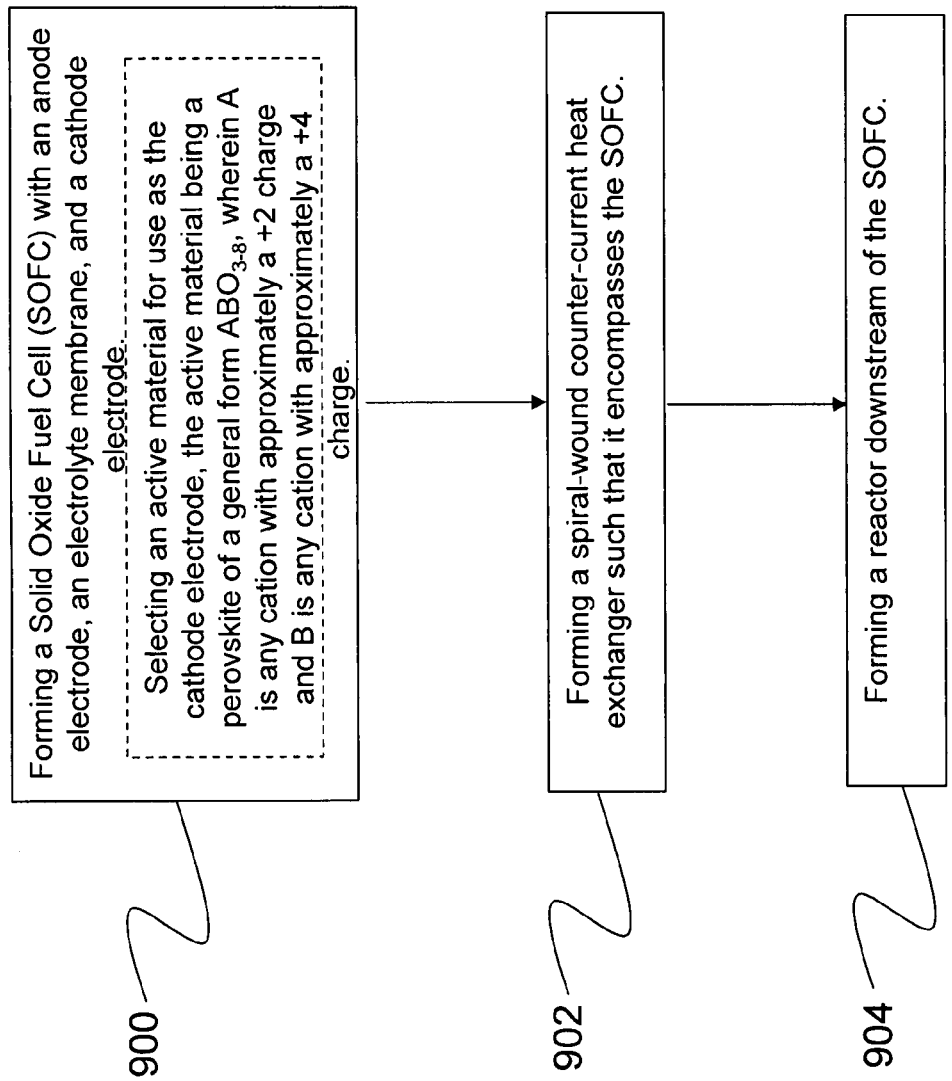
FIG. 9 shows the process flow for fabricating the power generator.

FIG. 9 depicts a flowchart indicating the steps taken in the method for forming the power generator, including the act of forming a SOFC 900 with an anode electrode, an electrolyte membrane, and a cathode electrode. The initial step of forming the SOFC 900 also includes the selection of an active material for use as the cathode electrode, the active material being a perovskite of a general form $ABO_{3-\delta}$, wherein A is any cation with approximately a +2 charge and B is any cation with approximately a +4 charge. The selection of the cathode material is further described in U.S. patent application Ser. No. 10/861,828 (pending), incorporated herein by reference. The second step comprises forming a spiral-wound counter-current heat exchanger 902 such that it encompasses the SOFC, and forming a reactor 904 downstream of the SOFC.

One promising route for fabricating either anode or cathode supported thin-film structures are through colloidal deposition techniques. The materials of the supporting electrode structure (the appropriate electrocatalyst mixed with the appropriate electrolyte) are first milled to yield a homogenous powder. In a non-limiting example, the electrode powders are then die-pressed at low pressure to about 300 to 2000 micrometers in thickness and lightly fired to allow handling. In the next step, this porous support electrode is coated with a colloidal dispersion of the electrolyte. The choice of configuration, either anode-supported or cathode-supported, is driven by cell design and/or materials compatibility issues at the sintering temperature of the bilayer structure. For the case of planar SOFCs based on zirconia electrolytes, co-firing of a NiO-YSZ substrate with a thin YSZ film is a relatively straightforward procedure due to the absence of reactions at the electrolyte/electrode interface at the sintering temperature of 1300 to 1500° C. The bilayer structures are typically sintered for four hours before cooling to room temperature. The second electrode is subsequently applied to the electrolyte through a preferred method, non-limiting examples of which are aerosol spray methods or screen printing. The cathode may be fabricated from a perovskite material of a general form $ABO_{3-\delta}$, wherein A is any cation with approximately a +2 charge and B is any cation with approximately a +4 charge, and of an electrolyte material compatible with the perovskite. The use of this material is further described in U.S. patent application Ser. No. 10/861,828 (pending), incorporated herein by reference.

In the ideal case, neither electrode material reacts with the electrolyte and the entire tri-layer structure can be co-fired in a single step, simplifying fabrication procedures. In the unfortunate case where both electrode materials react with the electrolyte at the sintering temperature, alternative routes requiring separate fabrication of the layers can be pursued.

The spiral-wound heat exchange structure can be fabricated through any suitable method, a non-limiting example of which includes wire electrical discharge machining (known as wire EDM). The parts are manufactured from a material selected to facilitate fabrication and provide for optimal conductivity. A non-limiting example includes tungsten carbide with ten percent cobalt.

In another embodiment, the method of fabricating the power generator comprises additional acts of forming a reactor downstream of the SOFC. This embodiment provides for greater ease of thermal management of the power generator and eliminates unspent fuels and oxidants. The reactor is preferable in the SCFC configuration.

What is claimed is:

1. A power generator, comprising:
    a chamber containing at least a portion of a solid oxide fuel cell (SOFC), the SOFC comprising:
        an anode;
        an electrolyte membrane connected with the anode;
        a cathode connected with the electrolyte membrane; and
    a spiral-wound counter-current heat exchanger encompassing the chamber, the spiral-wound counter-current heat exchanger including walls that form a first passageway and an second passageway, both the first passageway and the second passageway are connected with the chamber and run adjacent to one another in a spiral around the chamber and lead to an exterior of the power generator, whereby the first passageway functions as a first inlet and the second passageway functions as an outlet, such that reactants introduced into the power generator flow into the first inlet from the exterior of the power generator and past the SOFC where the reactants react to release energy and reaction products, the reaction products thereafter leave the SOFC through the outlet and thereby transfer heat to incoming reactants in the adjacent inlet, and subsequently exit through the outlet.

2. A power generator as set forth in claim 1, wherein the chamber is a chamber configuration selected from a group consisting of a single chamber containing both fuel and an oxidant, and at least two chambers, a first chamber being a fuel chamber and a second chamber being an oxidant chamber.

3. A power generator as set forth in claim 2, further comprising a reactor located downstream of the SOFC for converting un-reacted reactants.

4. A power generator as set forth in claim 3, wherein the reactor is a catalytic combustor.

5. A power generator as set forth in claim 4, wherein the spiral-wound counter-current heat exchanger further comprises a second inlet.

6. A power generator as set forth in claim 5, wherein the second inlet is configured in a configuration selected from a group consisting of being connected with the same chamber as the first inlet; being connected with a second chamber; and being introduced downstream of the SOFC and upstream of the reactor for introducing air into a reactant stream after the SOFC but before the reactor, and when the second inlet is connected with a second chamber, the spiral-wound counter-current heat exchanger further comprises a second outlet connected with the second chamber for allowing reaction products from reactants introduced into the second inlet to exit through the second outlet.

7. A power generator as set forth in claim 6, wherein the anode, cathode, and electrolyte materials of the SOFC are selected to operate using reactants selected from a group consisting of air, hydrogen, and hydrocarbon fuel.

8. A power generator as set forth in claim 7, wherein the chamber further comprises at least one additional SOFC electrically connected with the SOFC, the combination constituting a series of SOFCs.

9. A power generator as set forth in claim 8, wherein each SOFC in the series of SOFCs is electrically connected with at least one other SOFC through a series connection.

10. A power generator as set forth in claim 9, wherein a SOFC in the series of SOFCs is positioned such that the anode faces an anode from another SOFC, allowing the electrolyte to function as a barrier for gas diffusion between the anode and the cathode.

11. A power generator as set forth in claim 10, wherein a SOFC in the series of SOFCs is positioned such that the cathode faces a cathode from another SOFC, allowing the electrolyte to function as a barrier for gas diffusion between the anode and the cathode.

12. A power generator as set forth in claim 11, further comprising at least one nonconductive porous inter-connector positioned in a gap selected from a group consisting of space between two adjacent anodes and space between two adjacent cathodes.

13. A power generator as set forth in claim 12, wherein each nonconductive porous inter-connector has a porosity, where the porosity of the nonconductive porous inter-connector positioned between two adjacent cathodes differs from that of the porosity of the nonconductive porous inter-connector positioned between two adjacent anodes.

14. A power generator as set forth in claim 13, wherein the chamber includes at least two SOFCs, at least one constituting an upstream SOFC with at least another SOFC located downstream from the upstream SOFC, thereby constituting a downstream SOFC.

15. A power generator as set forth in claim 14, wherein the downstream SOFC is positioned in the chamber such that the anode is aligned with the upstream SOFC's cathode, whereby un-reacted reactants thereafter pass by the downstream anode.

16. A power generator as set forth in claim 15, wherein the downstream SOFC is positioned in the chamber such that the cathode is aligned with the upstream SOFC's anode, whereby un-reacted reactants thereafter pass by the downstream cathode.

17. A power generator as set forth in claim 16, wherein the anode and the cathode are connected with the electrolyte through a connection selected from a group consisting of being directly connected with the electrolyte and of using the passageway walls of the spiral-wound counter-current heat exchanger as the anode and cathode electrodes.

18. A power generator as set forth in claim 17, wherein the anode is comprised of a mixture of nickel and an oxygen ion conductor.

19. A power generator as set forth in claim 18, wherein the electrolyte is constructed from a material selected from a group consisting of ceria, barium zirconate, bismuth oxide, lanthanum gallate, barium cerate, and zirconia.

20. A power generator as set forth in claim 19, wherein the catalytic combustor is formed of a material selected from a group consisting of platinum, palladium, and rhodium.

21. A power generator as set forth in claim 20, wherein the cathode is comprised of a mixed oxygen ion and electronic conductor.

22. A power generator as set forth in claim 21, wherein the cathode is constructed from a material selected from a group consisting of lanthanum strontium manganate, lanthanum strontium cobalt nickel oxide, and samarium strontium cobalt oxide.

23. A power generator as set forth in claim 22, wherein the anode is constructed from a material selected from a group consisting of nickel-YSZ (yttria stabilized zirconia), nickel-doped ceria, a noble metal and nickel-YSZ, a noble metal and nickel-ceria.

24. A power generator as set forth in claim 23, wherein the spiral-wound counter-current heat exchanger is constructed from a material having a thermal conductivity less than 2 watts per meter per Kelvin.

25. A power generator as set forth in claim 24, further comprising a micro-aspirator in fluid communication with both the first inlet and the second inlet for controlling fuel and air flow being introduced to the SOFC.

26. A power generator as set forth in claim 25, further comprising an external battery electrically connected with the SOFC to allow for operative initiation of the power generator through resistive heating.

27. A power generator as set forth in claim 4, wherein the catalytic combustor is formed of a material selected from a group consisting of platinum, palladium, and rhodium.

28. A power generator as set forth in claim 1, wherein the cathode is comprised of a mixed oxygen ion and electronic conductor.

29. A power generator as set forth in claim 1, wherein the cathode is constructed from a material selected from a group consisting of lanthanum strontium manganate, lanthanum strontium cobalt nickel oxide, and samarium strontium cobalt oxide.

30. A power generator as set forth in claim 1, further comprising a reactor located downstream of the SOFC for converting un-reacted reactants.

31. A power generator as set forth in claim 1, wherein the anode, cathode, and electrolyte materials of the SOFC are selected to operate using reactants selected from a group consisting of air, hydrogen, and hydrocarbon fuel.

32. A power generator as set forth in claim 1, wherein the chamber further comprises at least one additional SOFC electrically connected with the SOFC, the combination constituting a series of SOFCs.

33. A power generator as set forth in claim 32, wherein each SOFC in the series of SOFCs is electrically connected with at least one other SOFC through a series connection.

34. A power generator as set forth in claim 32, wherein a SOFC in the series of SOFCs is positioned such that the anode faces an anode from another SOFC, allowing the electrolyte to function as a barrier for gas diffusion between the anode and the cathode.

35. A power generator as set forth in claim 32, wherein a SOFC in the series of SOFCs is positioned such that the cathode faces a cathode from another SOFC, allowing the electrolyte to function as a barrier for gas diffusion between the anode and the cathode.

36. A power generator as set forth in claim 32, further comprising at least one nonconductive porous inter-connector positioned in a gap selected from a group consisting of space between two adjacent anodes and space between two adjacent cathodes.

37. A power generator as set forth in claim 36, wherein each nonconductive porous inter-connector has a porosity, where the porosity of the nonconductive porous inter-connector positioned between two adjacent cathodes differs from that of the porosity of the nonconductive porous inter-connector positioned between two adjacent anodes.

38. A power generator as set forth in claim 1, wherein the chamber includes at least two SOFCs, at least one constituting an upstream SOFC with at least another SOFC located downstream from the upstream SOFC, thereby constituting a downstream SOFC.

39. A power generator as set forth in claim 38, wherein the downstream SOFC is positioned in the chamber such that the anode is aligned with the upstream SOFC's cathode, whereby un-reacted reactants thereafter pass by the downstream anode.

40. A power generator as set forth in claim 38, wherein the downstream SOFC is positioned in the chamber such that the cathode is aligned with the upstream SOFC's anode, whereby un-reacted reactants thereafter pass by the downstream cathode.

41. A power generator as set forth in claim 1, wherein the anode and the cathode are connected with the electrolyte through a connection selected from a group consisting of being directly connected with the electrolyte and of using walls of the spiral-wound counter-current heat exchanger as the anode and cathode electrodes.

42. A power generator as set forth in claim 1, wherein the anode is comprised of a mixture of nickel and an oxygen ion conductor.

43. A power generator as set forth in claim 1, wherein the electrolyte is constructed from a material selected from a group consisting of ceria, barium zirconate, bismuth oxide, lanthanum gallate, barium cerate, and zirconia.

44. A power generator as set forth in claim 1, wherein the anode is constructed from a material selected from a group consisting of nickel-YSZ (yttria stabilized zirconia), nickel-doped ceria, a noble metal and nickel-YSZ, a noble metal and nickel-ceria.

45. A power generator as set forth in claim 1, wherein the spiral-wound counter-current heat exchanger is constructed from a material having a thermal conductivity less than 2 watts per meter per Kelvin.

46. A power generator as set forth in claim 1, wherein the spiral-wound counter-current heat exchanger further comprises a second inlet.

47. A power generator as set forth in claim 46, wherein the second inlet is configured in a configuration selected from a group consisting of being connected with the same chamber as the first inlet; being connected with a second chamber; and being introduced downstream of the SOFC and upstream of the reactor for introducing air into a reactant stream after the SOFC but before the reactor, and when the second inlet is connected with a second chamber, the spiral-wound counter-current heat exchanger further comprises a second outlet connected with the second chamber for allowing reaction products from reactants introduced into the second inlet to exit through the second outlet.

48. A power generator as set forth in claim 46, further comprising a micro-aspirator in fluid communication with both the first inlet and the second inlet for controlling fuel and air flow being introduced to the SOFC.

49. A power generator as set forth in claim 1, further comprising an external battery electrically connected with the SOFC to allow for operative initiation of the power generator through resistive heating.

50. A power generator as set forth in claim 1, wherein the cathode is formed of a perovskite of a general form $ABO_{3-\delta}$, wherein A is any cation with approximately a +2 charge and B is any cation with approximately a +4 charge, and of an electrolyte material compatible with the perovskite.

51. A power generator as set forth in claim 50, wherein the perovskite takes the general form $(A'_{1-x}A''_x)BO_{3-\delta}$, wherein the average charge of A' and A'' is approximately +2, and x is less than or equal to 1.

52. A power generator as set forth in claim 50, wherein the perovskite takes the general form $A(B'_{1-y}B''_y)O_{3-\delta}$, wherein the average charge of B' and B'' is approximately +4, and y is less than or equal to 1.

53. A power generator as set forth in claim 50, wherein the perovskite takes the general form $(A'_{1-x}A''_x)(B'_{1-y}B''_y)O_{3-\delta}$, wherein the average charge of A' and A'' is approximately +2, and the average charge of B' and B'' is approximately +4, and x and y are both less than or equal to 1.

54. A power generator as set forth in claim 50, wherein A is any alkaline earth metal cation having approximately a +2 charge, and B is any transition metal cation having approximately a +4 charge.

55. A power generator as set forth in claim 54, wherein A' and A'' are any alkaline earth metal cations, the average charge of A' and A'' is approximately +2, B is any transition metal cation with approximately a +4 charge, and x is less than or equal to 1.

56. A power generator as set forth in claim 55, wherein A is any alkaline earth metal cation with approximately a +2 charge, B' and B'' are any transition metal cations, the average charge of B' and B'' is approximately +4, and y is less than or equal to 1.

57. A power generator as set forth in claim 56, wherein A' and A'' are alkaline earth metal cations, the average of charge A' and A'' is approximately +2, B' and B'' are transition metal cations, the average charge of B' and B'' is approximately +4, and both x and y are less than or equal to 1.

58. A power generator as set forth in claim 50, wherein the perovskite takes the general form $(Ba_{1-x}A_x)BO_{3-\delta}$, wherein A is any alkaline earth metal cation other than Ba, the average charge of A and Ba is approximately +2, B is any transition metal cation having a charge of approximately +4, and x is less than or equal to 1.

59. A power generator as set forth in claim 50, wherein the perovskite takes the general form $(Ba_{1-x}A_x)(B'_{1-y}B''_y)O_{3-\delta}$, wherein A is any alkaline earth metal cation other than Ba, the average charge of Ba and A is approximately +2, B' and B'' are any transition metal cations, the average charge of B' and B'' is approximately +4, and both x and y are less than or equal to 1.

60. A power generator as set forth in claim 50, wherein the perovskite takes the general form $BaBO_{3-\delta}$, wherein B is any transition metal cation with approximately a +4 charge.

61. A power generator as set forth in claim 50, wherein the perovskite takes the general form $Ba_{1-x}Sr_xBO_{3-\delta}$, wherein B is any transition metal cation with approximately a +4 charge, and x is less than or equal to 1.

62. A power generator as set forth in claim 50, wherein the perovskite takes the general form $Ba_{1-x}Sr_x(B'_{1-y}B''_y)O_{3-\delta}$, wherein B' and B'' are any transition metal cations, the average charge of B' and B'' is approximately a +4 charge, both x and y are less than or equal to 1.

63. A power generator as set forth in claim 50, wherein the perovskite takes the general form $Ba_{1-x}Sr_xCoO_{3-\delta}$, wherein x is less than or equal to 1.

64. A power generator as set forth in claim 50, wherein the perovskite takes the general form $Ba_{1-x}Sr_xCo_{1-y}B_yO_{3-\delta}$, wherein B is any transition metal cation, the average charge of Co and B is approximately +4, and both x and y are less than or equal to 1.

65. A power generator as set forth in claim 50, wherein the perovskite takes the general form $Ba_{1-x}Sr_xCo_{1-y}Fe_yO_{3-\delta}$, wherein x and y are both less than or equal to 1.

66. A power generator as set forth in claim 50, wherein the perovskite takes the general form $Ba_{0.5}Sr_{0.5}Co_{0.8}Fe_{0.2}O_{3-\delta}$.

67. A power generator as set forth in claim 50, wherein the electrolyte is present in the cathode in a positive amount up to approximately 40% by weight of the total weight of the cathode.

68. A power generator as set forth in claim 50, wherein the cathode further comprises a precious metal, the precious metal being selected from a group consisting of Ag, Au, Pt, Pd, or mixtures thereof.

69. A power generator as set forth in claim 68, wherein the precious metal is present in the cathode material in a positive amount up to approximately 60% by weight of the total weight of the cathode.

70. A power generator as set forth in claim 50, wherein the electrolyte material is selected from a group consisting of samaria doped ceria, gadallium doped ceria, Sc doped zirconia, yttria doped zirconia and lanthanum strontium sallium manganese oxide perovskites.

71. A method for forming a power generator, the method comprising acts of
forming a solid oxide fuel cell (SOFC), the SOFC comprising:
an anode electrode;
an electrolyte membrane connected with the anode;
a cathode electrode connected with the electrolyte membrane; and
forming a spiral-wound counter-current heat exchanger such that the heat exchanger encompasses the SOFC, the spiral-wound counter-current heat exchanger including a first passageway and an second passageway, both the first passageway and the second passageway are connected with the chamber and run adjacent to one another in a spiral around the chamber and lead to an exterior of the power generator, whereby the first passageway functions as a first inlet and the second passageway functions as an outlet, such that reactants introduced into the power generator flow into the first inlet from the exterior of the power generator and past the SOFC where the reactants react to produce energy and reaction products, the reaction products thereafter leave the SOFC through the outlet and thereby transfer heat to incoming reactants in the adjacent inlet, and subsequently exit through the outlet.

72. A method for forming a power generator as set forth in claim 71, further comprising an act of forming a reactor downstream of the SOFC.

73. A method for forming a power generator as set forth in claim 72, wherein the act of forming the SOFC further comprises an act of selecting an active material for use as the cathode electrode, the active material selected being a perovskite of a general form $ABO_{3-\delta}$, wherein A is any cation with approximately a +2 charge and B is any cation with approximately a +4 charge, and an electrolyte material compatible with the perovskite.

74. A method for power generation, the method comprising acts of:
selecting a chamber containing at least a portion of a solid oxide fuel cell (SOFC), the SOFC comprising:
an anode;
an electrolyte membrane connected with the anode;
a cathode connected with the electrolyte membrane;
selecting a spiral-wound counter-current heat exchanger that encompasses the chamber, the spiral-wound counter-current heat exchanger includes a first passageway and an second passageway, both the first passageway and the second passageway are connected with the chamber and run adjacent to one another in a spiral around the chamber and lead to an exterior of the power generator, whereby the first passageway functions as a first inlet and the second passageway functions as an outlet; and
introducing reactants into the power generator into the first inlet from the exterior of the power generator, such that the reacts flow past the SOFC where the reactants react to produce energy and reaction products, the reaction products thereafter leave the SOFC through the outlet and thereby transfer heat to incoming reactants in the adjacent inlet, and subsequently exit through the outlet.

75. A method for power generation as set forth in claim 74, further comprising an act of selecting a chamber configuration from a group consisting of a single chamber containing both fuel and an oxidant, and at least two chambers, a first chamber being a fuel chamber and a second chamber being an oxidant chamber.

76. A method for power generation as set forth in claim 74, further comprising an act of converting reactants not reacted by the SOFC through a reactor located downstream of the SOFC.

77. A method for power generation as set forth in claim 76, wherein in the act of selecting a spiral-wound counter-current heat exchanger, the spiral-wound counter-current heat exchanger comprises a second inlet, the second inlet being configured in a configuration selected from a group consisting of being connected with the same chamber as the first inlet; being connected with a second chamber; and being introduced downstream of the SOFC and upstream of the reactor for introducing air into a reactant stream after the SOFC, but before the reactor, and when the second inlet is connected with a second chamber, the spiral-wound counter-current heat exchanger further comprises a second outlet connected with the second chamber for allowing reaction products from reactants introduced into the second inlet to exit through the second outlet.

78. A method for power generation as set forth in claim 74, wherein the act of introducing reactants into the power generator further comprises an act of selecting the reactant from a group consisting of air, hydrogen, and hydrocarbon fuel.

79. A method for power generation as set forth in claim 74, wherein in the act of selecting a chamber containing at least a portion of a solid oxide fuel cell, the chamber comprises at least one additional SOFC electrically connected with the SOFC, the combination constituting a series of SOFCs, wherein each SOFC in the series of SOFCs is electrically connected with at least one other SOFC through a series connection.

* * * * *